United States Patent [19]
Suga et al.

[11] Patent Number: 5,949,823
[45] Date of Patent: Sep. 7, 1999

[54] DATA COMMUNICATION SYSTEM AND RADIO IC CARD SYSTEM

[75] Inventors: Takashi Suga, Yokohama; Yoshihiko Hayashi, Tokyo; Ryouzou Yoshino, Hadano; Kenji Nagai, Iruma, all of Japan

[73] Assignee: Hitachi, Ltd., Tokyo, Japan

[21] Appl. No.: 08/928,434

[22] Filed: Sep. 12, 1997

[30] Foreign Application Priority Data

Sep. 13, 1996 [JP] Japan .................................... 8-243274

[51] Int. Cl.⁶ .................................................... H04L 27/00
[52] U.S. Cl. ........................ 375/256; 375/340; 329/345; 329/346
[58] Field of Search .................................. 375/256, 219, 375/269, 272, 279, 316, 324, 340, 350, 376, 373; 329/304, 306, 309, 345, 346; 235/380

[56] References Cited

U.S. PATENT DOCUMENTS

| | | | |
|---|---|---|---|
| 5,418,353 | 5/1995 | Katayama et al. | 235/380 |
| 5,455,408 | 10/1995 | Urata et al. | 235/384 |
| 5,671,254 | 9/1997 | Nagata et al. | 375/326 |
| 5,698,838 | 12/1997 | Yamaguchi | 235/492 |

*Primary Examiner*—Wellington Chin
*Assistant Examiner*—Congvan Tran
*Attorney, Agent, or Firm*—Antonelli, Terry, Stout & Kraus, LLP

[57] ABSTRACT

An arrangement to realize the functions of a radio card system in which power is transmitted to perform data communication. According to such arrangement, a delay line and a clock regenerating circuit such as PLL circuit which are previously necessary for demodulation by PSK are not necessary, and thus functions of data communication are realized by minimum hardware construction, size, cost and power consumption. Further, in a data communication system in which electric power transmission using a signal of a frequency fp and digital data communication using a carrier wave of a frequency fs are performed by radio, fs and fp are in the relationship of fs=fp/N (where N is an integer) and a phase shift P when the phase of the carrier wave is modulated by PSK is (M×360°)/N (where M, N are integers and P is preferably not equal to 180°).

14 Claims, 7 Drawing Sheets

DATA COMMUNICATION SYSTEM AND RADIO IC CARD SYSTEM

BACKGROUND OF THE INVENTION

1. Field of the Invention

The present invention relates to a radio IC card system using a digital data communication system and a radio IC card, and more particularly relates to a radio IC card system and radio IC card arrangements not requiring the use of a delay line or a phase-locked loop (PLL).

2. Description of Related Art

In a card system such as a commuter ticket, in addition to a contact and intimate contact-type system such as a magnetic card system, a non-contact-type system (e.g., activated by radio) has become of interest. That is to say, electric power required for operation is supplied to a card by radio transmission (thus advantageously not requiring a battery), and an electronic circuit on the card is supplied with electric power from such transmission, and as a result thereof, performs communicating with a main controller.

In the above described system, the controller modulates a high frequency signal by information to be transmitted, and sends it from a fixed (e.g., wall-mounted) base unit via air transmission using an antenna. Energy sent is received by an antenna of a mobile (i.e., card) unit, and information is reproduced by a demodulating circuit on the card. The high-frequency signal is called a carrier wave. Several types of modulation/demodulation systems are known for conveying information, i.e., known are amplitude shift keying (ASK) in which an amplitude of the carrier wave is shifted according to digital information, frequency shift keying in which a frequency of the carrier wave is shifted (FSK), and phase shift keying (PSK) in which a phase of the carrier wave is shifted. PSK is best because it has a low signal error rate and a narrow occupation frequency bandwidth, and therefore it has been used in many modulation/demodulation systems for digital data transmission. A delay detection system using a delay line and a detection system in which a synchronous clock is generated by a phase-locked loop has been known as when the information is demodulated by PSK. However, use of a delay line and phase-locked loop is disadvantageous in that such adds to a complexity, size, cost and power consumption of the system.

SUMMARY OF THE INVENTION

An object of the present invention is to provide a data communication system and a radio IC card system in which data communication of high quality is performed by a minimum hardware complexity, size, cost and power consumption, i.e., is performed by a construction not using (i.e., exclusive of) a delay line or PLL which is typically required for a PSK demodulation system.

More particularly, the present invention is a system in which electric power transmission using a signal of a frequency fp and digital data communication using a carrier wave of a frequency fs are performed by radio, and fs and fp are in the relationship of fs=fp/N (where N is an integer) and a phase shift P when the phase of the carrier wave is modulated by PSK is (M×360°)/N (where M is also an integer). Also, in a preferred embodiment, the phase shift P is preferably not equal to 180°.

Moreover, the present invention is a radio card system using the above described data communication system.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein.

DETAILED DESCRIPTION OF THE PREFERRED EMBODIMENTS OF THE INVENTION

Before beginning a detailed description of the subject invention, mention of the following is in order: When appropriate, like reference numerals and characters are used to designate identical, corresponding or similar components in differing figure drawings.

Figure 1:
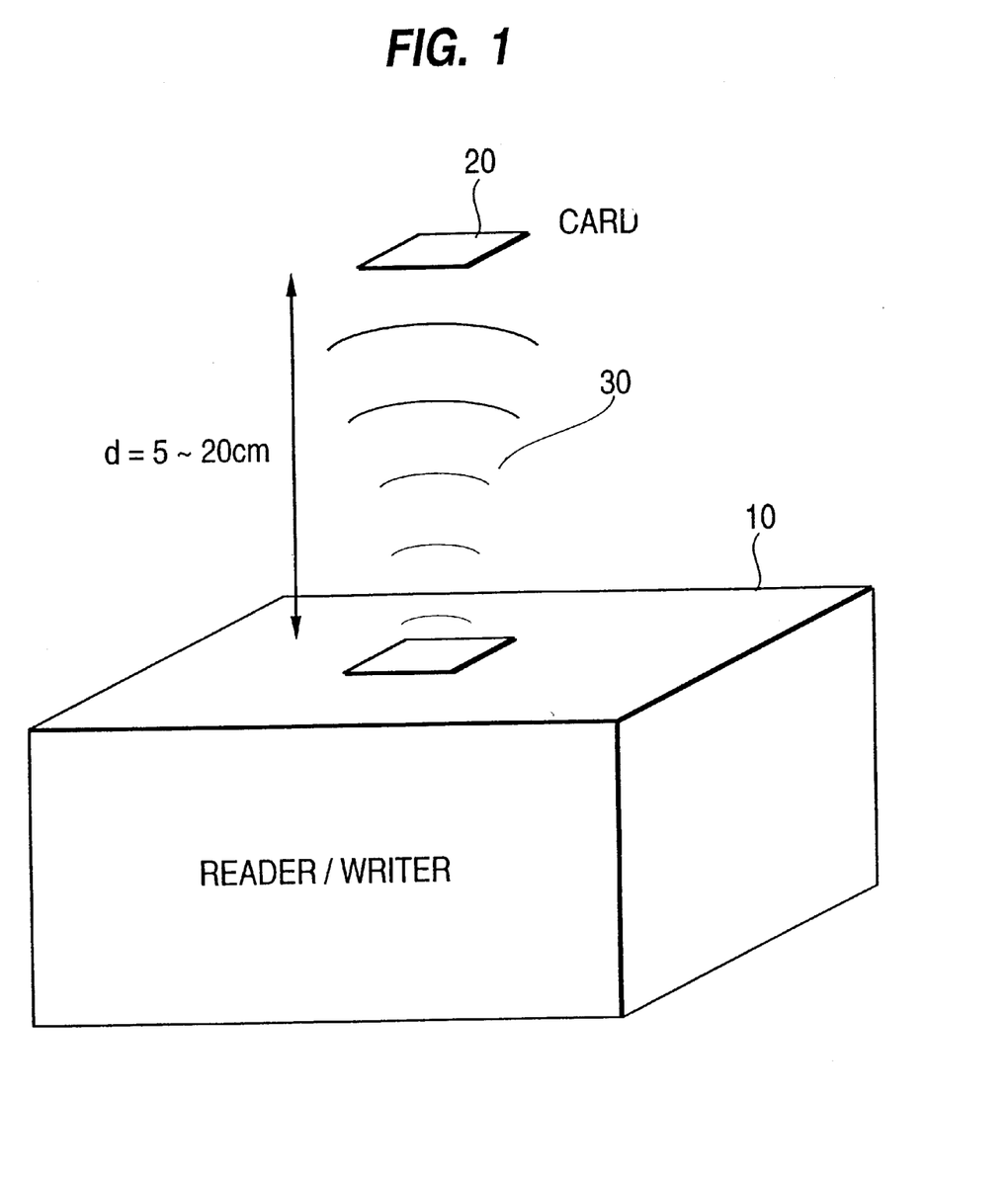
FIG. 1 shows a schematic construction of a radio card system in accordance with the present invention.

Turning now to detailed description, preferred embodiments of a data communication system in accordance with the present invention will be hereinafter described using the accompanied drawings. More specifically, FIG. 1 shows a schematic construction of a system in accordance with the present invention in which electric power is transmitted by radio (e.g., air) transmission from a base unit (i.e., a reader/writer 10 disposed at a ticket gate of a station or in a bus) to a mobile unit (i.e., an IC card 20) which passes or is brought in close proximity d (e.g., d=5–20 cm) near the reader/writer, i.e., without having to contact it. Electric power transmitted from reader/writer 10 via radio transmission 30 and received by the IC card 20, activates an electronic circuit on the IC card 20 for sending/receiving information between the reader/writer 10 and IC card 20 pertaining to a commuting cost/payment, whereby the IC card 20 automatically functions as a commuting ticket and settles a commuting charge cost and/or accepts/exchanges other types of information.

Figure 2:
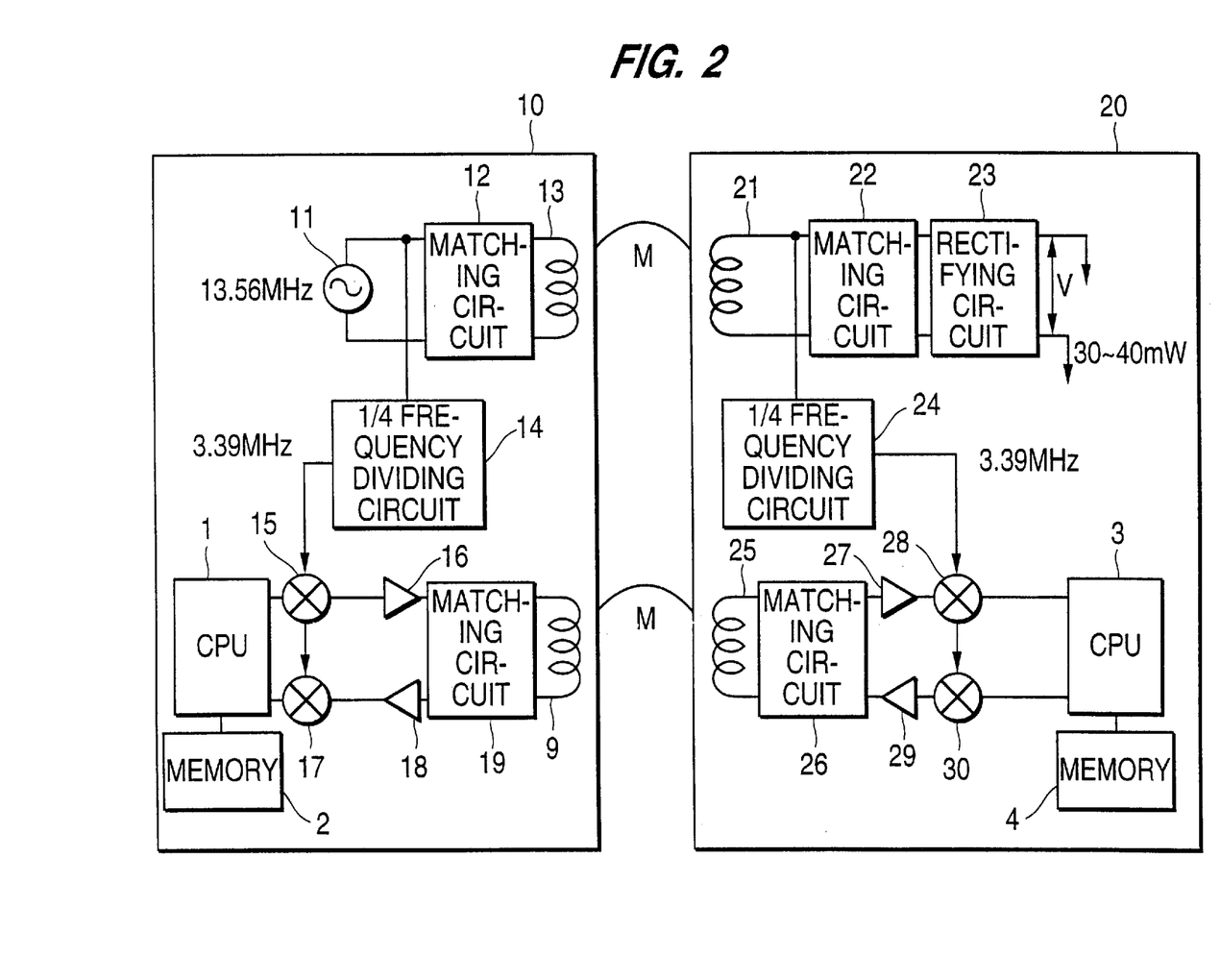
FIG. 2 shows a preferred embodiment of data communication arrangements in accordance with the present invention.

FIG. 2 shows a preferred embodiment of data communication in accordance with the present invention. A reader/ writer 10 comprises an oscillator 11 for frequency transmitting electric power (e.g., at 13.56 MHz) via a signal fp (FIG. 5), a ¼ frequency dividing circuit 14 for generating a carrier wave fs (e.g., at 3.39 MHz) for data communication from the signal fp, a matching circuit 12 for matching impedance with an antenna coil 13 for effectively and efficiently transmitting electric power, a CPU 1 for controlling the whole system, a memory 2 for storing data, a modulator 15 for modulating communication data, a power amplifier 16, a matching circuit 19 for matching impedance with an antenna coil 9, an amplifier 18 for amplifying a signal received by the antenna coil, and a demodulator 17.

A radio card 20 receiving and being activated by electric power and data information from the reader/writer 10 comprises an antenna coil 21 for receiving electric power and a matching circuit 22 for effectively and efficiently receiving the electric power, a rectifying circuit 23 for generating a direct-current power supply voltage, an antenna coil 25 for sending and receiving the data communication signal, a matching circuit 26 for matching impedance of the antenna coil 25, an amplifier 27 for amplifying the received signal, a demodulator 28, a CPU 3 for controlling data and communications on the card, a memory 4, a modulator 30, and a power amplifier 29.

An ISM radio frequency bandwidth for industry, science, and medicine is used for transmitting electric power for sending higher output power. More particularly, a radio frequency of 13.56 MHz is used in an embodiment of FIG. 2. As a result thereof, frequency for communication can be arbitrarily set if it is a minimum power is used which is not more than a standard value of a field density established by a law. In the preferred embodiment of the present invention, a carrier-wave frequency of communication is preferably set at one integer-th (¼ in the embodiment) of the frequency for transmitting electric power, i.e., 13.56 MHz/4=3.39 MHz. More specifically, in the ¼ frequency dividing circuit 24 in the radio card 20, a signal of the transmitted and received electric power is taken out from the antenna 21, and is divided by a ¼ frequency divider to produce a carrier-wave fp (FIG. 6) which is subsequently used to perform a synchronous detection. A demodulating circuit 28 is described in detail by using FIG. 3.

Figure 3:
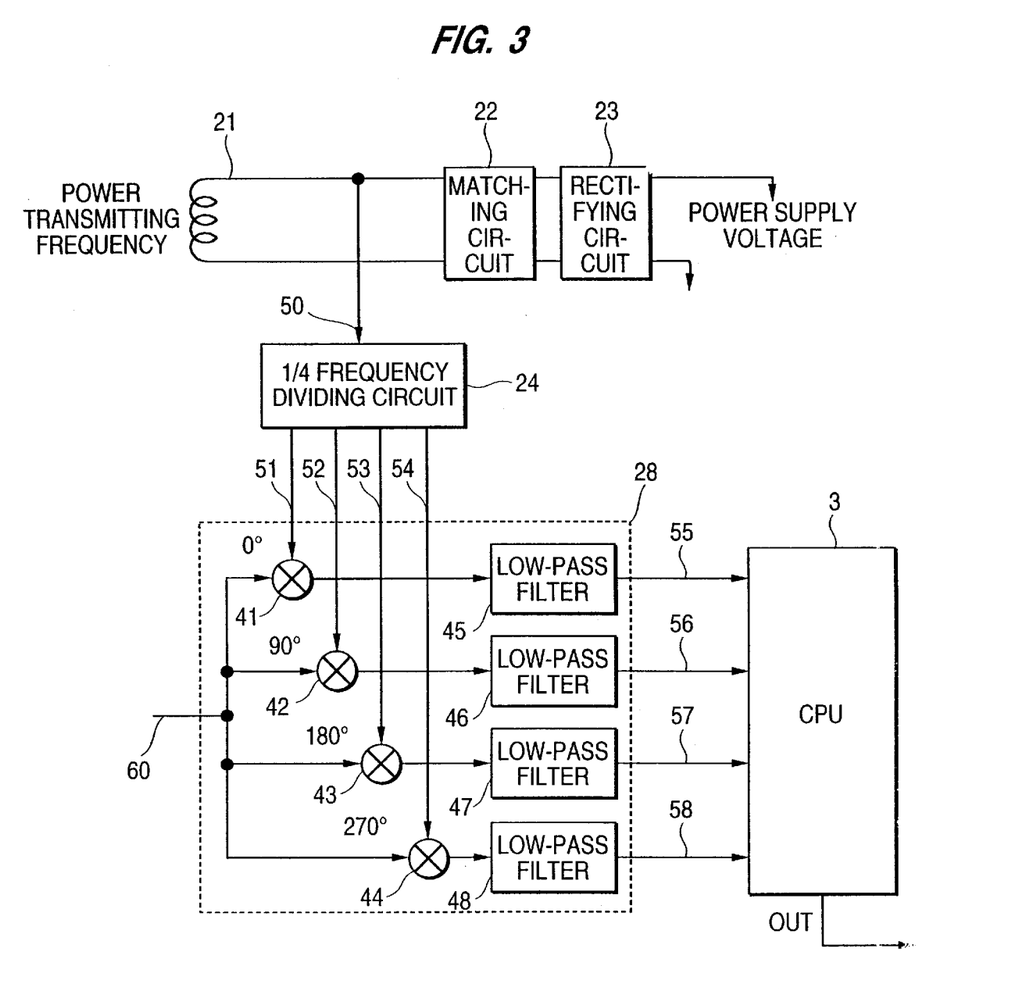
FIG. 3 shows a detailed demodulating circuit in a preferred embodiment of data communications in accordance with the present invention.

More particularly, the demodulating circuit 28 comprises four synchronous detectors 41, 42, 43, 44 for performing synchronous detection by means of carrier wave reference signals 51, 52, 53, 54 (which are produced by dividing electric power transmission signal 50 by four with a frequency dividing circuit 24 and producing different phases thereof) and four low-pass filters 45, 46, 47, 48 so as to generate demodulating signals 55, 56, 57, 58, which signals are monitored and processed by the CPU 3.

The modulated wave from the reader/writer 10 can be preferably modulated/demodulated by making a phase shift modulation/demodulation according to a PSK of 360°/N=90° (where N=4) and selecting one of demodulating signals 55, 56, 57, 58 at any given time to correctly perform synchronous detection. That is to say, in a system in which electric power transmission using a signal of a frequency fp and digital data communication using a carrier wave of a frequency fs are performed by radio transmission, fs and fp are in a relationship of fs=fp/N (where N is an integer) and a phase shift when the phase of the carrier wave is modulated by PSK is (M×360°)/N (where M, N are integers and a phase shift P is preferably not equal to 180°).

Figure 6:
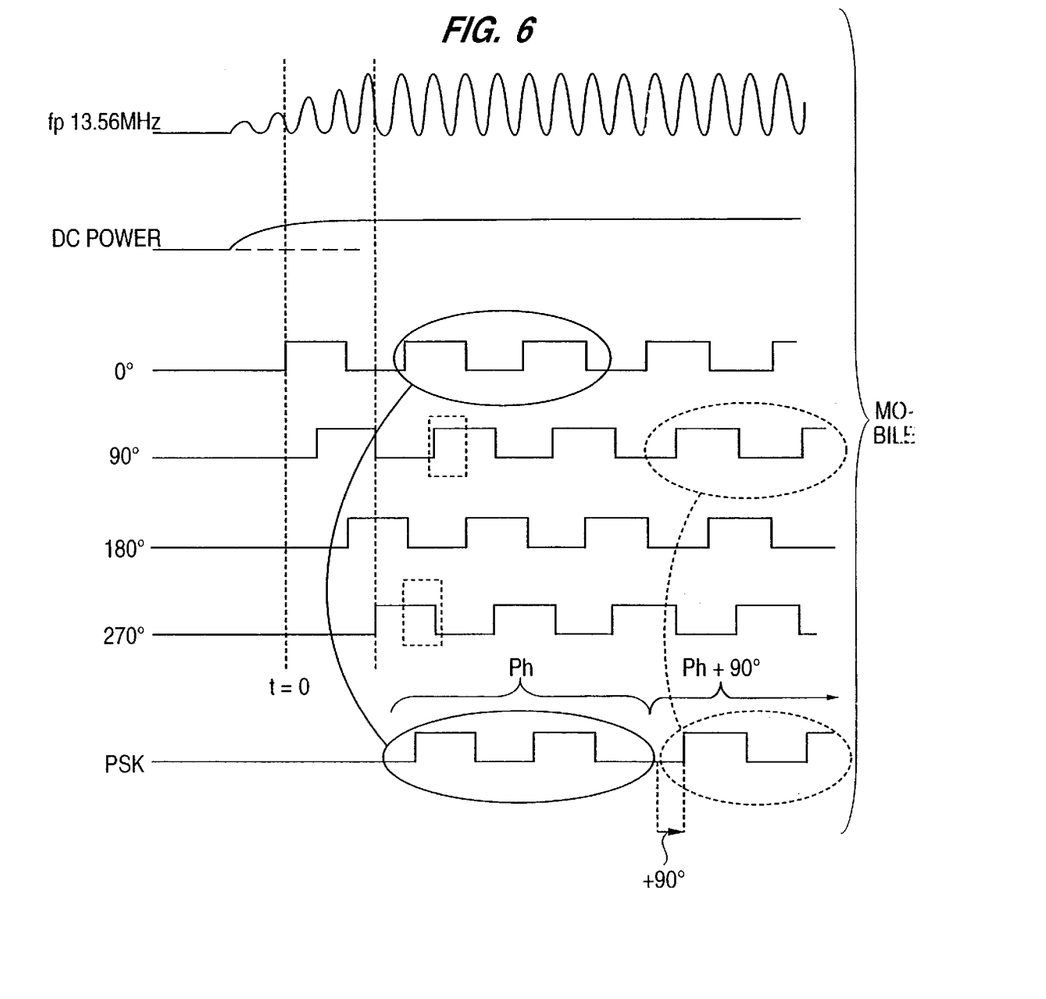

Synchronous detectors 41–44 shown in FIG. 3 are each provided with a function for detecting a data signal having a specified phase, i.e., the data signal which is produced by dividing an oscillation frequency from the oscillator 11 of the reader/writer and received at antenna 21 by four and is set differently in phase at each of these synchronous detectors 41 to 44. For example, the data signals with 0°, 90°, 180° and 360° phases as shown in a bottom portion of FIG. 6 are set at inputs of the synchronous detectors 41 to 44, respectively. Therefore, since all operation frequencies of the reader/ writer 10 and the card 20 are produced by using a frequency signal from the same oscillator 11, they are in a synchronous state (i.e., synchronous in frequency).

Turning next to a more detailed, exemplary construction, it is recommended that each synchronous detector 41 to 44 be constructed of an AND circuit or the like, having as one input thereof an appropriate reference phase signal (i.e., 0°, 90°, 180° or 360°) produced by dividing the oscillation frequency from the oscillator 11, and having as a second input thereof, the received data signal. With the synchronous detectors 41 to 44 connected like this, at any given time of data signal receipt, one of the synchronous detectors will substantially synchronize with the phase of the received data signal. Responsive to synchronization of the data and phase signal at an AND gate synchronous detector, such synchronous detector will output a specified signal, e.g., a bi-level signal constructed of a logical one level and a logical zero level can be output from the active (i.e., synchronized) synchronous detector. As only one synchronous detector 41–44 is synchronized with the phase of the incoming signal at any given time, any phase shift within an incoming input signal will cause a current (i.e., presently synchronized) synchronous detector to lose synchronization because of the phase shift, and will cause a differing synchronous detector to gain synchronization. By monitoring a change of synchronization from any one of the synchronous detectors 41–44 to a differing synchronous detector 41–44, the CPU 3 can detect a phase shift and demodulate an incoming PSK input signal into an appropriate demodulated output signal.

Figure 7:
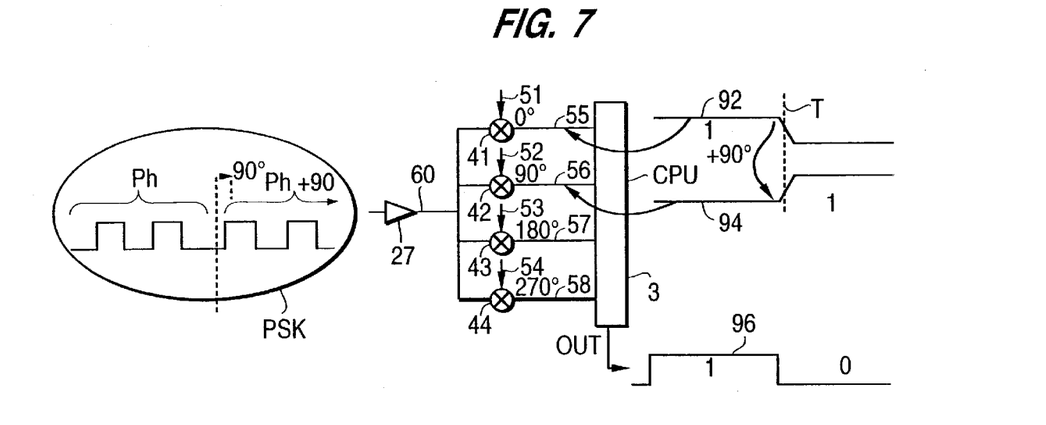
FIGS. 7 and 8 are used to describe operations of the present invention with exemplary +90° and −90° phase shifts, respectively.

More particularly, operation of the above arrangement will be described in more detail with respect to FIGS. 3 and 6–8. Near a bottom of FIG. 6, there is shown an incoming PSK input signal which is input along a line 60 (FIG. 3) to the demodulator 28, and which is branched to each of the synchronous detectors 41–44. FIG. 7 likewise illustrates the PSK input signal being input and branched to each of the synchronous detectors 41–44. However, in FIG. 7 (and FIGS. 8–10), the low-pass filters 45–48 which are illustrated in FIG. 3 have been omitted to simplify illustration and descriptions with respect thereto. In continuing discussion, it can be seen from the joined solid-line encircled areas in FIG. 6 that a first portion Ph of the PSK input signal is phase synchronized with a 0° reference phase divided from the received transmission signal 50 (which matches oscillation frequency from the oscillator 11). This 0° reference phase is received along line 51 at the synchronous detector 41. Since the 0° reference phase and the Ph phase inputs of the synchronous detector 41 substantially match in phase, the arrangement of the synchronous detector 41 and the low-pass filter 45 cause such synchronous detector branch to output a logical 1 signal as long as the 0° reference phase and the Ph phase inputs remain synchronized in phase, i.e., as shown by signal 92 in FIG. 7.

The CPU 3 monitors the output signals along all of the synchronous detector branches, and upon detection of a logical 1 signal along one of the branches (such as the signal 92 on the detector 41 branch) indicating input signal synchronization thereon, the CPU makes note of the branch which is synchronized (e.g., within the memory 4, or within internal working registers), and waits for a change of synchronization to a differing branch. Further, the CPU 3 knows (e.g., via programming) that synchronization along each of the differing detector branches represents a matching of the PSK input signal with the differing reference phase signals, i.e., in this example, synchronization along the detector branch 41 represents PSK input signal matching with the 0° reference phase, the detector branch 42 with the 90° reference phase, the detector branch 43 with the 180° reference phase, and the detector branch 44 with the 270° reference phase.

In the above discussion with respect to the initial Ph portion of the PSK input signal and the logical one output from the detector branch 41, all other synchronous detectors 42–44 branches output a logical 0 during such time, as none of the other synchronous detectors 42–44 have a reference phase input substantially synchronized in phase with the Ph phase input. More particularly, while portions of other reference phases which are not phase-matched may have some logical 1 pulse area overlap with the logical 1 pulse of the PSK input signal (e.g., see dashed-line rectangular areas of the 90°, 270° reference phases in FIG. 6), the synchronous detector branches are designed to eliminate outputs corresponding to these spurious overlaps (e.g., via the low-pass filters 45–48 of FIG. 3), or alternatively, the CPU 3 can be programmed/designed to recognize and ignore such outputs.

Moving on in discussion, at a certain time T (FIGS. 6-7), a +90° phase shift occurs within the PSK input signal to start a Ph+90° period. At such occurrence, the detector 41 branch loses synchronization and thus begins to output a logical zero along such branch, i.e., as indicated by the logical one to zero transition within the signal 92 (FIG. 7). Substantially simultaneously therewith, the detector 42 branch gains synchronization and thus begins to output a logical one along such branch as indicated by the zero to one transition within the signal 94 (FIG. 7). The CPU 3 continuing to monitor the output signals along all of the synchronous detector branches, detects the loss of the logical one along the detector branch 41 and gain of the logical one along the detector branch 41. From the knowledge that the detector branch 41 represents a PSK input signal matching with the 0° reference phase and detector branch 41 with the 90° reference phase, the CPU recognizes that the synchronization change from the branch 41 to the branch 42 indicates a +90° phase shift of the PSK input signal, i.e., as indicated within FIG. 7 between the signals 92 and 94. Since, in the present example, a +90° phase shift of the PSK input signal represents a data signal transition from logical one to logical zero, the CPU is able to successfully demodulate the PSK input signal so as to initially output a logical one during the initial Ph period (see OUT signal 96 in FIG. 7), and transition to output a logical zero during the subsequent Ph+90° period.

Figure 8:
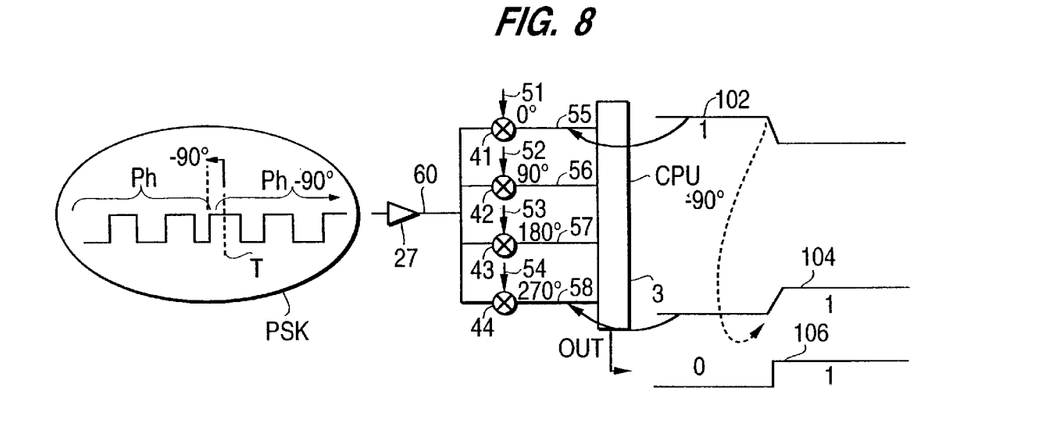

FIG. 8 is similar to FIG. 7, but illustrates the opposite situation of a −90° phase shift of the PSK input signal. More particularly, in the FIG. 8 example, the CPU 3 detects (at a time T) the loss of the logical one along the detector branch 41 and gain of the logical one along the detector branch 44. From the knowledge that the detector branch 41 represents PSK input signal matching with the 0° reference phase and detector branch 44 with the 270° reference phase, the CPU recognizes that the synchronization change from the branch 41 to the branch 44 indicates a −90° phase shift of the PSK input signal, i.e., as indicated within FIG. 8 between the signals 102 and 104. Since, in the present example, a −90° phase shift of the PSK input signal represents a data signal transition from logical zero to logical one, the CPU is able to successfully demodulate the PSK input signal so as to initially output a logical zero during the initial Ph period (see OUT signal 106 in FIG. 8), and transition to output a logical one during the subsequent Ph−90° period.

It should be noted that the above discussions are illustrative of the fact that it is difficult if not impossible for the above-discussed arrangements to know a logical value of an initial PSK input signal portion until a first phase shift transition occurs. More particularly, when the CPU 3 detects an initial synchronization along any of the detector branches 55–58, the CPU 3 cannot be sure whether such initial synchronization corresponds to a logical one or a logical zero. It is only after the first synchronization shifting has occurred when the CPU 3 can tell the proper logical value of the initial synchronization, i.e., since, in the present example, a −90° phase shift of the PSK input signal represents a data signal transition from logical zero to logical one, upon the first synchronization shifting being a −90° phase shift, the CPU would then know that the initial synchronization period must have corresponded to a logical zero, and upon the first synchronization shifting being a +90° phase shift, the CPU would then know that the initial synchronization period must have corresponded to a logical one.

Figure 9:
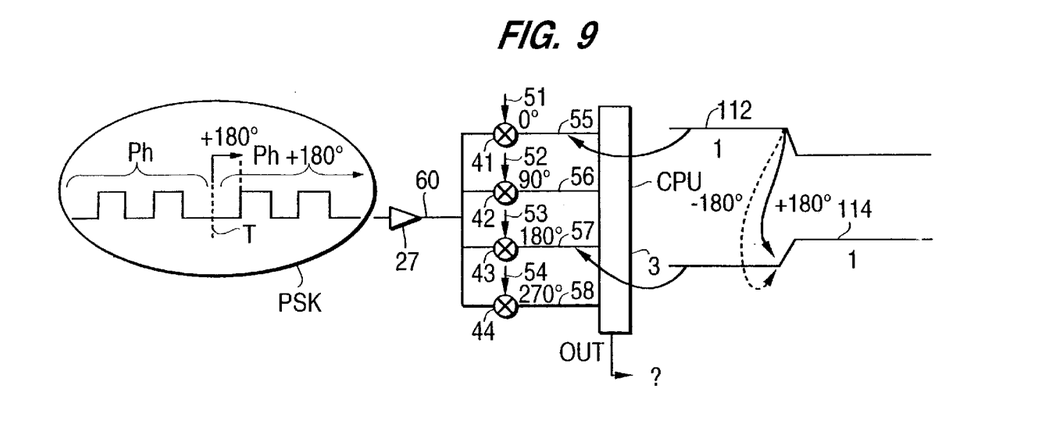
FIG. 9 is used to describe operation of the present invention with a 180° phase shift.

FIG. 9 is similar to FIGS. 7-8, but illustrates why a 180° phase shift of the PSK input signal is not optimum for use with the present invention. More particularly, in the FIG. 9 example, the CPU 3 detects (at a time T) the loss of the logical one along the detector branch 41 and gain of the logical one along the detector branch 43. From the knowledge that the detector branch 41 represents PSK input signal matching with the 0° reference phase and detector branch 43 with the 180° reference phase, the CPU recognizes that the synchronization change from the branch 41 to the branch 43 indicates a 180° phase shift of the PSK input signal. However, as the synchronization change from the branch 41 to the branch 43 could have been caused by either a +180° phase shift (indicated by the solid arrow between FIG. 9's signals 112 and 114), or a −180° phase shift (indicated by the dashed arrow between FIG. 9's signals 112 and 114), the CPU (without other information) cannot know whether a +180° phase shift indicating a logical one to logical zero transition has occurred, or alternatively whether a −180° phase shift indicating a logical zero to logical one transition has occurred. Therefore, it is desirable that a PSK method in which a phase shift other than 180 is used is adopted in the present invention.

Figure 4:
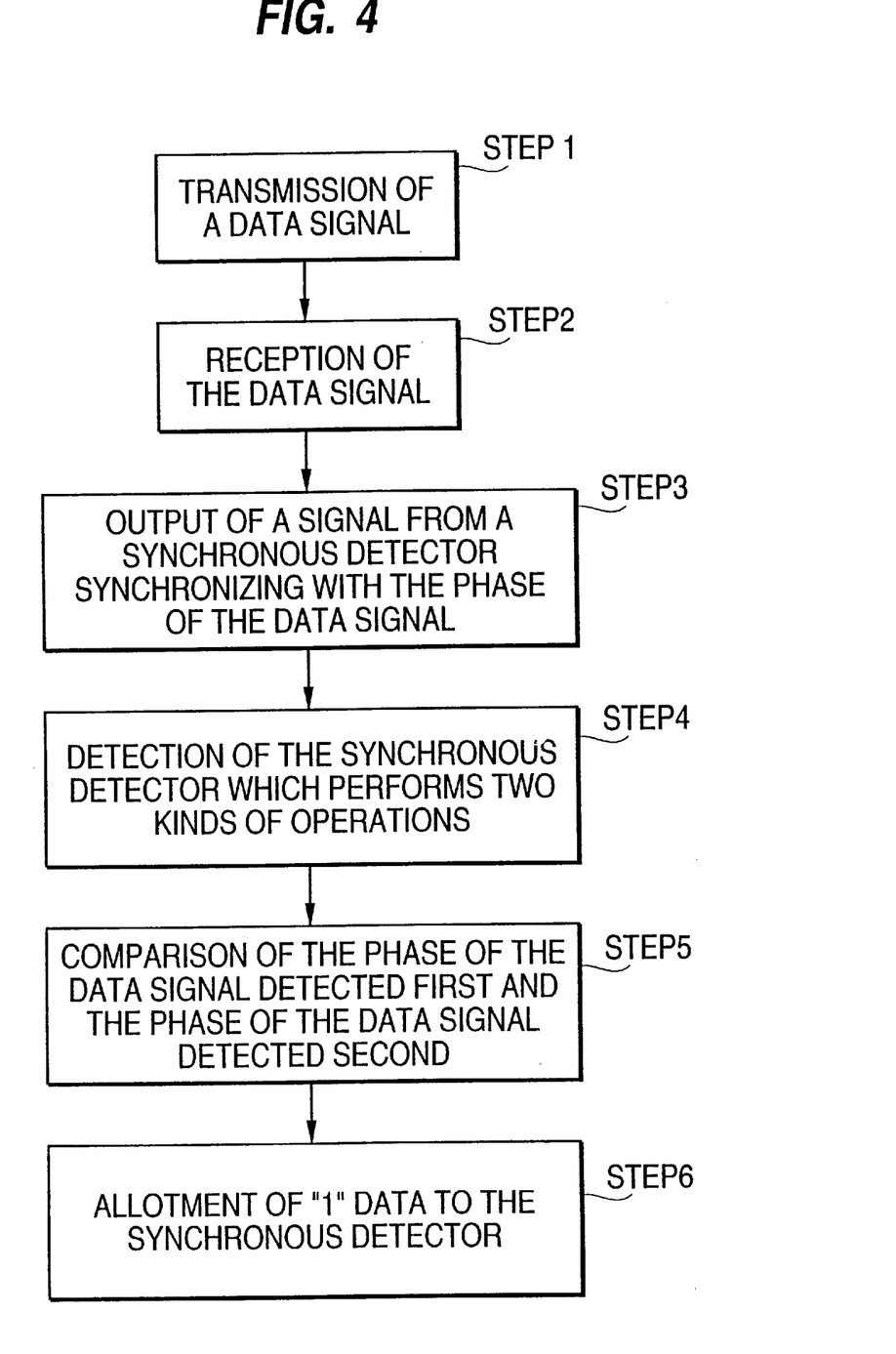
FIG. 4 is a flowchart illustrating an operation of the arrangement shown in FIG. 2.
Figure 5:
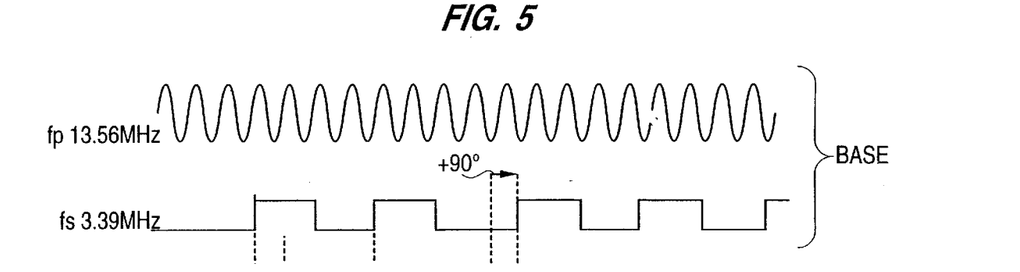
FIGS. 5 and 6 illustrate signals with respect to a base unit and a mobile unit of an embodiment of the present invention.

Turning now to further description, FIG. 4 is a flowchart of the operation of the system shown in FIG. 2. More particularly, in a step 1, a reader/writer 10 transmits a data signal, for example, a signal fs as shown in FIG. 5 by using an antenna coil 9. This signal fs is produced based on the signal fp from an oscillator 11. A card 20 receives the above described data signal (PSK signal in FIG. 6) by using an antenna coil 25 (step 2). At this time, a signal modulated by PSK is used as the data signal which is transmitted and received. More particularly, since the data signals are signals modulated by PSK, the data signals which are different in phases at transitional times are transmitted by the reader/writer 10. Therefore, the synchronous detectors 41 to 44 detect the data signals which are different in phases by means of the same processing as the above described processing (steps 3–4).

Next, a CPU 3 judges the relationship between the synchronous detector which first detects the data signal and the synchronous detector which second detects the data signal; that is to say, it compares the phase of the data signal detected first with the phase of the data signal detected second (step 5) and allots "1" to either of them (step 6). In this case, the received signals must be temporarily stored in a memory 4 or the like so as to compare or judge the phases as described above. Referring to FIG. 4, it allots "1" to the data signal whose phase leads 90°. As described above, since two kinds of phases are detected, the phase to which "1" is to be allotted among the data signals from the reader/writer 10 can be specified and the data signals from the reader/writer 10 can be correctly transmitted to the card 20.

Figure 10:
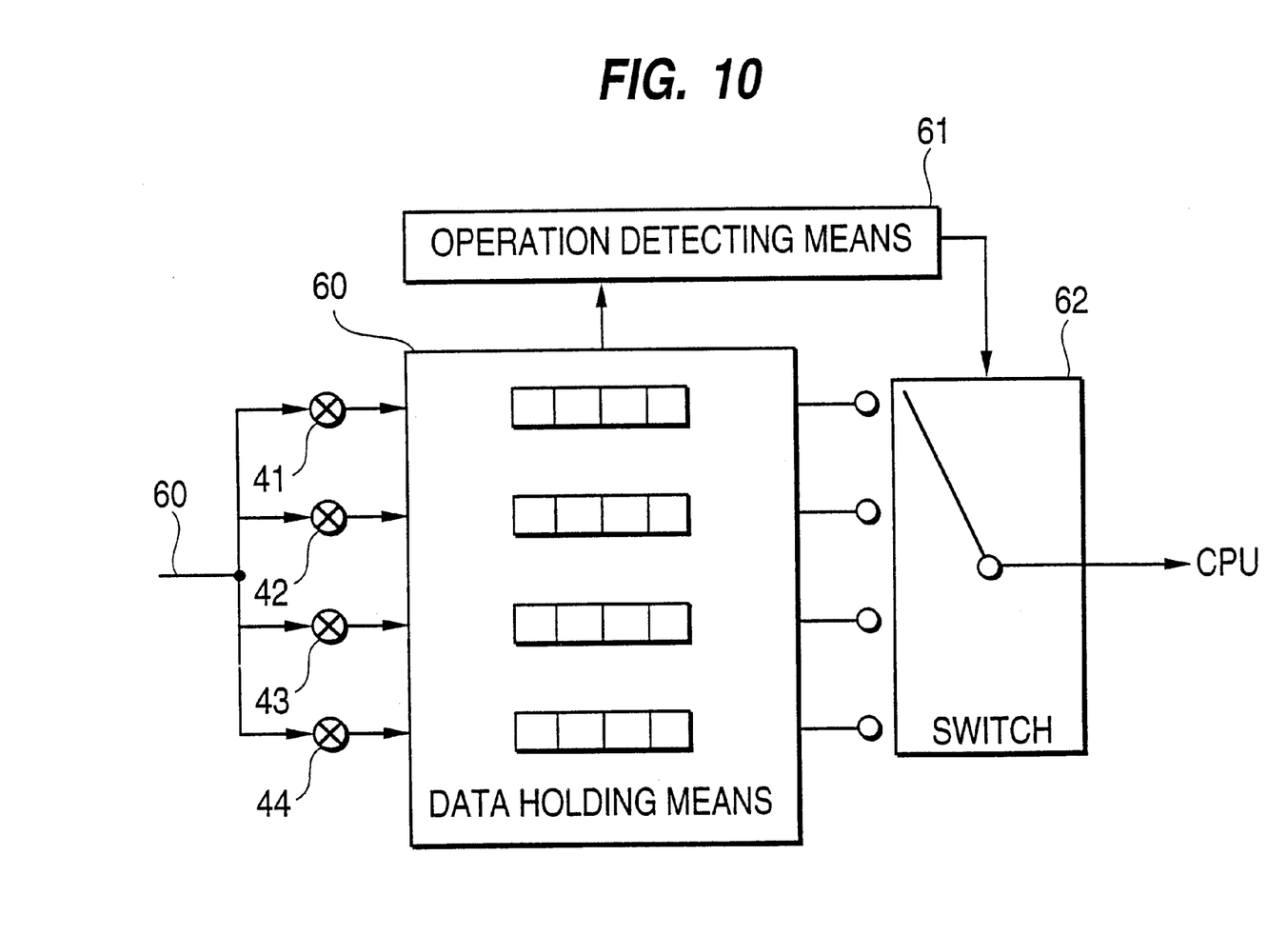
FIG. 10 illustrates a hardware arrangement useable with the present invention.

FIG. 10 shows an embodiment in which the above described processing is realized by a hardware. Referring to FIG. 10, the device according to the present invention comprises data holding means 60 for holding output signals from the synchronous detectors 41 to 44, an operation detecting means 61 connected to the data holding means 60, and a selecting means 62 for selecting a detector branch output based on the result of the operation detecting means. It is recommended that, for example, a shift register be used as the data holding means 60, and, for example, a switching circuit be used as the selecting means 62. First, the output of the synchronous detectors 41 to 44 is held by the data holding means 60. Next, the operation detecting means 61 detects the synchronous detector which performs two kinds of operations as described above by using the data held by the data holding means 60 and compares the phases of the received data signals by using the result of detection thereof. The selecting means 62 is controlled such that it selects the output of the synchronous detector to which "1" is allotted from the comparing results. For example, the selecting means 62 is controlled such that it selects the output of the synchronous detector whose phase leads compared with the signals from the other synchronous detectors. Moreover, the output of the synchronous detector is held by the data holding means 60 until the output of the synchronous detector to which "1" is allotted is selected. The controlled selecting means 62 selects the output of the synchronous detector to which "1" is allotted and inputs the selected output to the CPU. Therefore, the processing described in the above described embodiment can be realized by a hardware. Processing using the hardware arrangement is suitable for high speed processing, in comparison to a software arrangement.

While the above descriptions were directed mainly to discussion of the above circuits/operations within the mobile IC card 20, such circuits/operations are equally applicable within the stationary unit 10 to demodulate data transmitted (returned) from the mobile IC card 20, such that such unit 10 can likewise be constructed without the use of a delay line or PLL circuit.

According to the present invention and especially the aforementioned arrangement, a delay line and a clock regenerating circuit such as PLL circuit which is previously necessary for demodulation by PSK is not necessary, and thus functions of data communication are realized by minimum hardware construction, size, cost and power consumption. Moreover, according to the present invention, data communication of high quality can be performed by a minimum hardware constitution without using a delay line or PLL.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts, arrangements and/or uses of the subject combination arrangement within the scope of the foregoing disclosure, the drawings and the appended claims without departing from the spirit of the invention.

What is claimed is:

1. An IC card comprising:
    a receiver for receiving a modulated data signal transmitted from a base unit; and
    a demodulator for demodulating the received modulated data signal, the demodulator effecting demodulation of the received modulated data signal exclusive of a phase-locked-loop (PLL) circuit;
    wherein said demodulator comprises:
    a plurality of phase comparator circuits, each phase comparator circuit comparing a phase of the received modulated data signal with a different reference phase, for substantial correspondence therebetween; and
    a phase monitoring circuit monitoring phase comparison outputs from said plurality of phase comparator circuits, for detecting phase shifts in the received modulated data signal over time so as to demodulate the received modulated data signal,
    wherein each said phase comparator circuit comprises an AND gate connected to receive the received modulated data signal at a first input thereof and the reference phase at a second input thereof.

2. An IC card according to claim 1, wherein each said phase comparator circuit further comprises a filter circuit.

3. An IC card according to claim 2, wherein said phase monitoring circuit is more specifically a microprocessor.

4. An IC card further comprising:
    a receiver for receiving a modulated data signal transmitted from a base unit; and
    a demodulator for demodulating the received modulated data signal, the demodulator effecting demodulation of the received modulated data signal exclusive of a phase-locked-loop (PLL) circuit;
    a divide circuit for dividing a received power signal of a frequency fp so as to form a plurality of different reference phases of a frequency fs for use with said plurality of phase comparator circuits, wherein fs and fp are in a relationship of fs=fp/N (where N is an integer); and
    wherein a phase shift P when a phase of the modulated data signal is modulated by PSK is (M×360°)/N (where M is an integer).

5. An IC card according to claim 4, wherein said phase shift P is not equal to 180°.

6. An IC card comprising:
    a receiver for receiving a modulated data signal transmitted from a base unit; and
    a demodulator for demodulating the received modulated data signal, the demodulator effecting demodulation of the received modulated data signal exclusive of a phase-locked-loop (PLL) circuit;
    wherein said demodulator comprises:
    a divide circuit for dividing a received power signal of a frequency fp so as to form four different reference phases of a frequency fs for use with said plurality of phase comparator circuits, wherein fs and fp are in a relationship of fs=fp/4;
    four phase comparator circuits, each phase comparator circuit including an AND gate comparing a phase of the received modulated data signal with a different reference phase from said divide circuit, for substantial correspondence therebetween; and a phase monitoring microprocessor monitoring phase comparison outputs from said phase comparator circuits, for detecting phase shifts in the received modulated data signal from a current said phase comparator circuit to a different phase comparator circuit over time so as to demodulate the received modulated data signal.

7. A data communication system comprising:

a base unit for transmitting a modulated data signal; and a mobile unit for receiving and demodulating the modulated data signal, the mobile unit including a demodulating circuit exclusive of a phase-locked-loop (PLL) circuit for demodulating the modulated data signal, wherein said demodulating circuit comprises:

a plurality of phase comparator circuits, each phase comparator circuit comparing a phase of the received modulated data signal with a different reference phase, for substantial correspondence therebetween; and a phase monitoring circuit monitoring phase comparison outputs from said plurality of phase comparator circuits, for detecting phase shifts in the received modulated data signal over time so as to demodulate the received modulated data signal, wherein each said phase comparator circuit comprises an AND gate connected to receive the received modulated data signal at a first input thereof and the reference phase at a second input thereof.

8. A data communication system according to claim 7, wherein each said phase comparator circuit further comprises a filter circuit.

9. A data communication system according to claim 7, wherein said phase monitoring circuit is more specifically a microprocessor.

10. A data communication system further comprising:

a divide circuit for dividing a received power signal of a frequency fp so as to form a plurality of different reference phases of a frequency fs for use with said plurality of phase comparator circuits, wherein fs and fp are in a relationship of fs=fp/N (where N is an integer); and wherein a phase shift P when a phase of the modulated data signal is modulated by PSK is (M×360°)/N (where M is an integer), a divide circuit for dividing a received power signal of a frequency fp so as to form a plurality of different reference phases of a frequency fs for use with said plurality of phase comparator circuits, wherein fs and fp are in a relationship of fs=fp/N (where N is an integer); and wherein a phase shift P when a phase of the modulated data signal is modulated by PSK is (M×360°), N (where M is an integer).

11. A data communication system according to claim 10, wherein said phase shift P is not equal to 180°.

12. A data communication system comprises:

a divide circuit for dividing a received power signal of a frequency fp so as to form a plurality of different reference phases of a frequency fs for use with said plurality of phase comparator circuits, wherein fs and fp are in a relationship of fs=fp/N (where N is an integer); and wherein a phase shift P when a phase of the modulated data signal is modulated by PSK is (M×360°)/N (where M is an integer), a divide circuit for dividing a received power signal of a frequency fp so as to form four different reference phases of a frequency fs for use with said plurality of phase comparator circuits, wherein fs and fp are in a relationship of fs=fp/4;

four phase comparator circuits, each phase comparator circuit including an AND gate comparing a phase of the received modulated data signal with a different reference phase from said divide circuit, for substantial correspondence therebetween; and a phase monitoring microprocessor monitoring phase comparison outputs from said phase comparator circuits, for detecting phase shifts in the received modulated data signal from a current said phase comparator circuit to a different phase comparator circuit over time so as to demodulate the received modulated data signal.

13. A data communication system according to claim 10, wherein the mobile unit is an IC card.

14. A data communication system in which electric power transmission using a power signal of a frequency fp and digital data communication of a modulated data signal using a carrier wave of a frequency fs are performed by radio transmission from a base unit to a mobile unit, wherein fs and fp are in the relationship of fs=fp/N (where N is an integer) and a phase shift P when the phase of the carrier wave is modulated by PSK is (M×360°)/N (where M, N are integers and P is not equal to 180°); and comprising:

a divide circuit for dividing the power signal at the frequency fp so as to form synchronization signals of a plurality of different phases at said frequency fs for enabling demodulation of the modulated data signal; and a demodulator utilizing said plurality of different phases for demodulating the received modulated data signal, the demodulator effecting demodulation of the received modulated data signal exclusive of a phase-locked-loop (PLL) circuit.

* * * * *